United States Patent
Kimoto et al.

(10) Patent No.: US 9,036,008 B2
(45) Date of Patent: May 19, 2015

(54) IMAGE DISPLAY DEVICE

(75) Inventors: Takayuki Kimoto, Osaka (JP); Satoshi Hamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 430 days.

(21) Appl. No.: 13/478,079

(22) Filed: May 22, 2012

(65) Prior Publication Data
US 2012/0300028 A1   Nov. 29, 2012

(30) Foreign Application Priority Data

May 23, 2011   (JP) .................. 2011-114324

(51) Int. Cl.
*H04N 13/00* (2006.01)
*H04N 13/04* (2006.01)

(52) U.S. Cl.
CPC ....... *H04N 13/0022* (2013.01); *H04N 13/0438* (2013.01); *H04N 13/0459* (2013.01); *H04N 2013/0081* (2013.01)

(58) Field of Classification Search
None
See application file for complete search history.

(56) References Cited

U.S. PATENT DOCUMENTS

| 6,791,599 | B1 | 9/2004 | Okada et al. | |
| 2008/0192112 | A1* | 8/2008 | Hiramatsu et al. | 348/51 |
| 2010/0007582 | A1* | 1/2010 | Zalewski | 345/8 |
| 2010/0220178 | A1* | 9/2010 | Takahashi et al. | 348/54 |
| 2011/0157319 | A1* | 6/2011 | Mashitani et al. | 348/49 |
| 2011/0279643 | A1* | 11/2011 | Inamura | 348/43 |
| 2012/0008853 | A1* | 1/2012 | Li et al. | 382/154 |
| 2012/0120200 | A1* | 5/2012 | Newton et al. | 348/46 |
| 2012/0147141 | A1* | 6/2012 | Sasaki et al. | 348/43 |
| 2012/0200670 | A1* | 8/2012 | Pockett | 348/46 |

FOREIGN PATENT DOCUMENTS

| JP | 3157384 B | 2/2001 |
| JP | 3448467 B | 7/2003 |
| JP | 2005-142819 A | 6/2005 |

* cited by examiner

*Primary Examiner* — Sath V Perungavoor
*Assistant Examiner* — Janese Duley
(74) *Attorney, Agent, or Firm* — Shinjyu Global IP

(57) ABSTRACT

An image display device which includes a parallax adjustment unit, a display unit, a parallax detector, and a maximum parallax detector. The parallax adjustment unit is configured to obtain a right-eye image signal and a left-eye image signal. The parallax adjustment unit is configured to adjust a parallax between the right-eye image signal and left-eye image signal and output an adjusted image signal that includes an adjusted left-eye and adjusted right-eye signal. The parallax detector is configured to detect an amount of parallax between the right-eye and left-eye image signals. The maximum parallax detector is configured to detect a maximum value. The display unit is configured to display a right-eye image and a left-eye image and to display an augmented image including the right-eye image and the left-eye image as well as a monitor image indicating the amount of parallax detected and the maximum value.

18 Claims, 10 Drawing Sheets

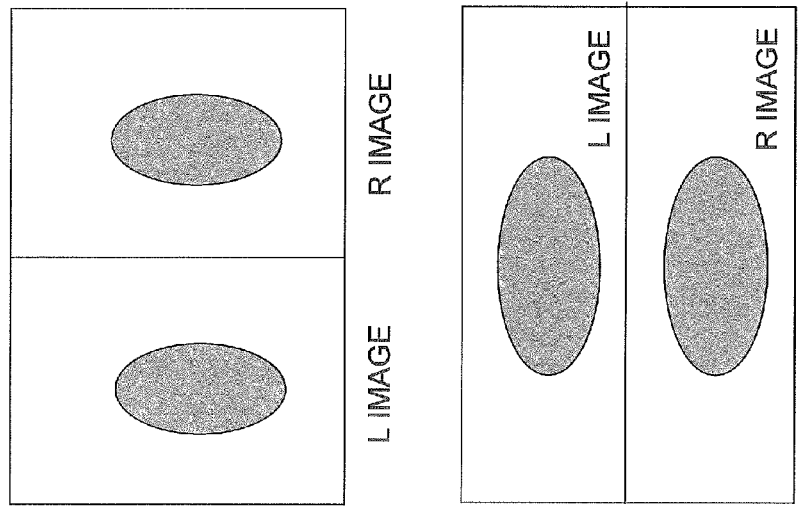
FIG. 3A
SIDE-BY-SIDE
FORMAT
FIG. 3B
TOP-AND-
BOTTOM
FORMAT
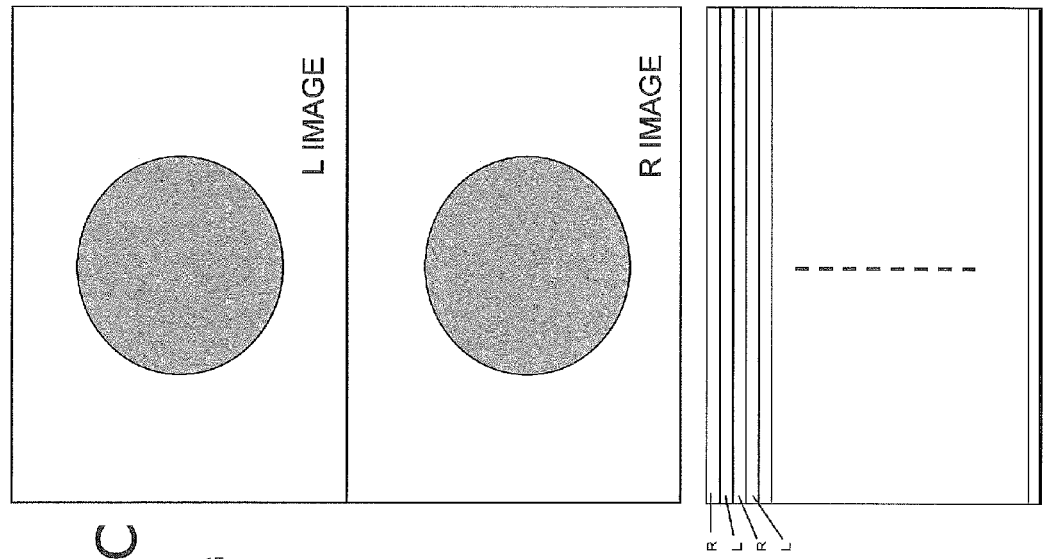
FIG. 3C
FRAME
PACKING
FORMAT
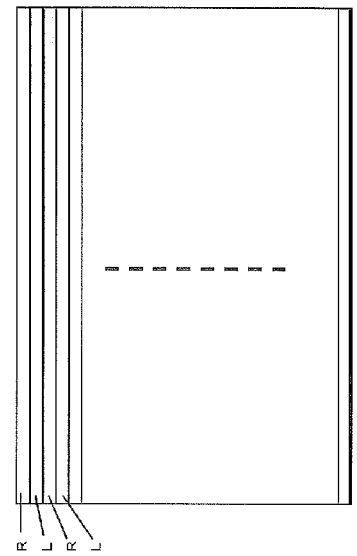
FIG. 3D
LINE
ALTERNATIVE
FORMAT

IMAGE DISPLAY DEVICE

CROSS-REFERENCE TO RELATED APPLICATIONS

This application claims priority under 35 U.S.C. §119 to Japanese Patent Application No. 2011-114324, filed on May 23, 2011. The entire disclosure of Japanese Patent Application No. 2011-114324 is hereby incorporated herein by reference.

BACKGROUND

1. Technical Field

The technique disclosed herein relates to an image display device for adjusting parallax included in a three-dimensional (abbreviated to "3D" hereafter) image displayed using a projector, a television set, or a similar device.

2. Background Information

In recent years, a variety of 3D formats such as frame packing, side-by-side, top-and-bottom, and line alternative have been defined in relation to High-Definition Multimedia Interface (HDMI) Version 1.4a. There has also been an increase in popularity of a display method in which active shutter glasses are driven in a synchronized manner while a right-eye image and a left-eye image (together referred to as "LR images" hereafter) are alternately displayed at a high speed using the frame sequential method, whereby stereoscopic vision is obtained For such displaying of LR images, a television or a projector that can be driven using the frame sequential method is often used. In particular, with regards to a projector, a larger screen size often results in a larger amount of parallax being included in an input image signal for the content, making it possible to provide an image with a greater stereoscopic effect.

However, the visual distance is more likely to decrease with increasing screen size, and the user may therefore experience motion sickness or biological discomfort due to parallax between the left and right eyes. For content for which image-capturing was performed without taking parallax angle into consideration, the amount of parallax contained in the input image signal can be excessive. In such an instance, again, the user experiences motion sickness or discomfort.

There has been proposed a method for controlling the display position of each of the LR images in the horizontal direction based on the amount of parallax between corresponding regions in the LR images, with an aim to achieve optimum stereoscopic vision (see Japanese Laid-Open Patent Application H8-9421).

A stereoscopic image device according to Japanese Laid-Open Patent Application H8-9421 has a left video camera for capturing a left-eye image, a right video camera for capturing a right-eye image and a stereoscopic display device. The stereoscopic display device controls the display position of each of the LR images in the horizontal direction based on control information that has been multiplexed with the LR images, the control information including focus information, zoom information, convergence angle, the amount of parallax for each segmented region, and the spacing between two video cameras.

SUMMARY

However, in the stereoscopic image device according to Japanese Laid-Open Patent Application H8-9421, an optimum stereoscopic display is achieved through a paired relationship between the left and right video cameras and the stereoscopic display device. Since much of the control information is not multiplexed for movies and other Blu-Ray content, it is difficult to display an optimum stereoscopic image using only the stereoscopic display device according to Japanese Laid-Open Patent Application H8-9421.

An objective of the technique disclosed herein is to provide an image display device in which parallax can be adjusted.

In accordance with one aspect of the technology disclosed herein, an image display device includes a parallax adjustment unit, a display unit, a parallax detector, and a maximum parallax detector. The parallax adjustment unit is configured to obtain a 3D image signal, the 3D image signal including a right-eye image signal and a left-eye image signal. The parallax adjustment unit is further configured to adjust a parallax between the right-eye image signal and left-eye image signal to output an adjusted signal. The adjusted signal includes an adjusted right-eye image signal and an adjusted left eye image signal. The parallax detector is configured to detect an amount of parallax between the adjusted right-eye image signal and the adjusted left-eye image signal. The maximum parallax detector is configured to detect a maximum value of the amount of parallax detected by the parallax detector. The display unit is configured to display a right-eye image and a left-eye image based on the adjusted signal, and to display the amount of parallax detected and the maximum value of the amount of parallax detected.

According to the image display device disclosed herein, it is possible to provide an image display device in which the parallax can be adjusted.

BRIEF DESCRIPTION OF DRAWINGS

Referring now to the attached drawings which form a part of this original disclosure:

FIG. 3 shows an example of an input format of a 3D input image signal;

DETAILED DESCRIPTION OF EMBODIMENTS

A description will now be given for an embodiment of the present invention with reference to the accompanying drawings. In the following embodiment, a description will be given using a projector as an example of an image display device. However, the image display device may be, e.g., a television set or a mobile telephone.

First Embodiment

1. Configuration of Use of Projector 100

Figure 1:
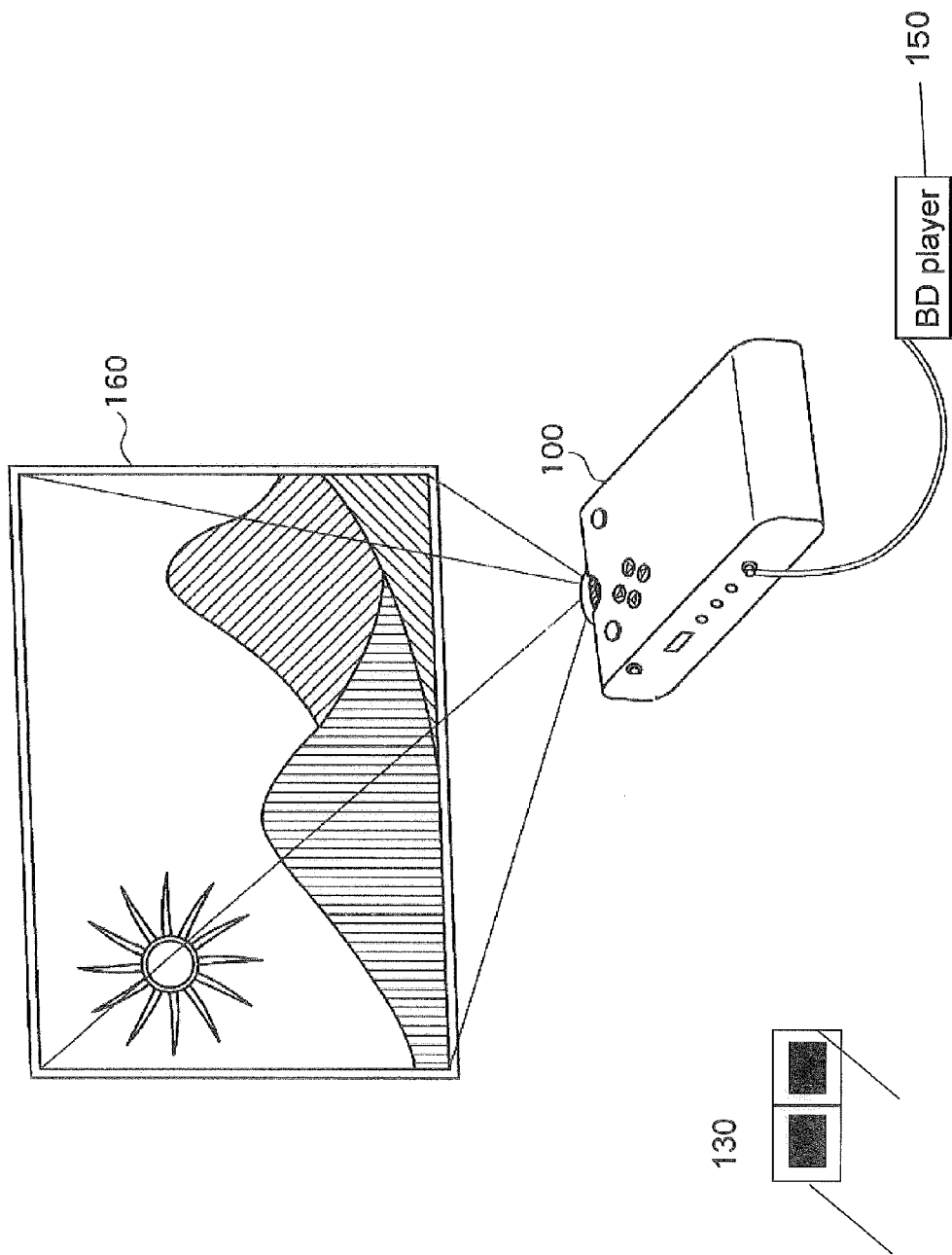
FIG. 1 shows a configuration of use of a projector.

FIG. 1 is a schematic diagram showing a configuration of use of a projector 100.

In FIG. 1, the projector 100 performs phase expansion or other signal processing on a 3D image signal inputted from a Blu-Ray disc (BD) player 150 connected to an input terminal and expands the signal for a liquid crystal panel and outputs an image using the frame sequential method. Then, the projector 100 displays, in an enlarged manner, a right-eye image (abbreviated as "R image" hereafter) and a left-eye image (abbreviated as "L image" hereafter) on a screen 160. The user is able to see a 3D image using active shutter glasses 130 that are driven so as to synchronize with LR images displayed using the frame sequential method.

2. Output Method According to Frame Sequential Method

Figure 2:
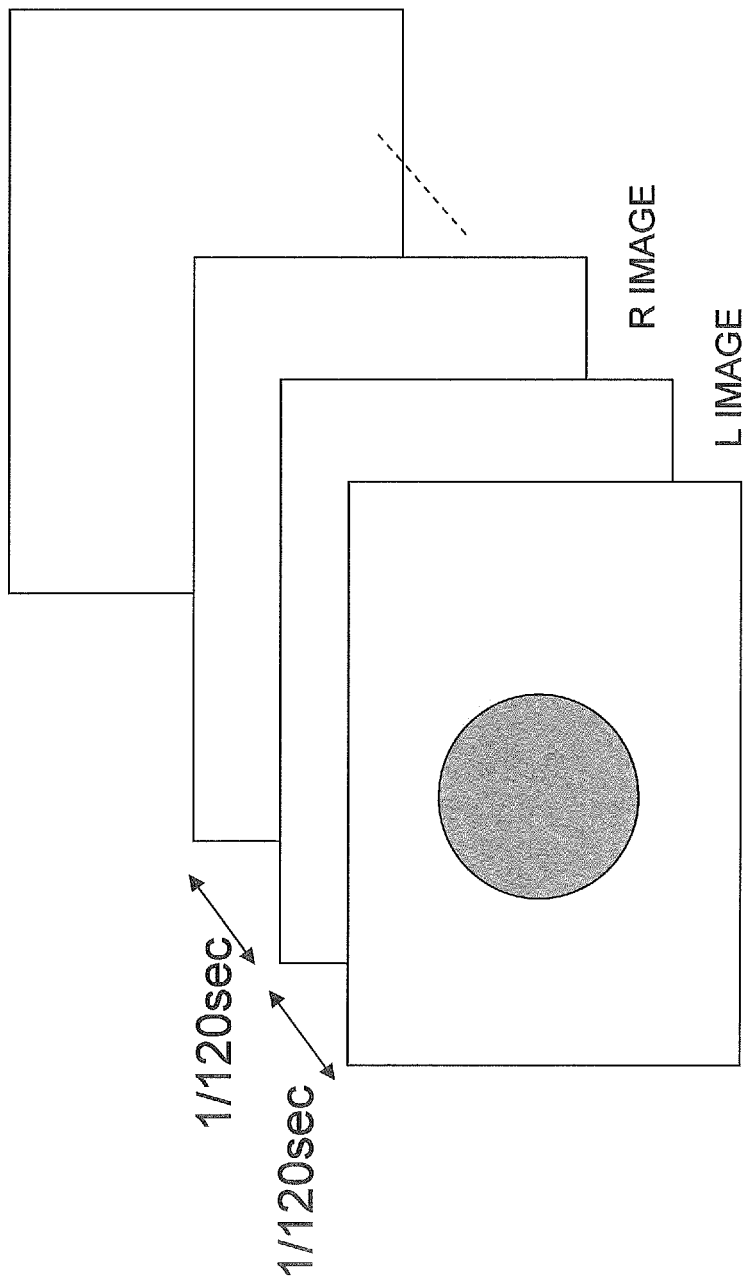
FIG. 2 is used to illustrate an output method according to the frame sequential method.

FIG. 2 is used to illustrate an output method according to the frame sequential method.

The LR images are alternated at, e.g., 120 Hz. The active shutter glasses 130 in FIG. 1 alternately open left and right visual fields so as to match the LR images that are alternated. The user sees, using the right eye and the left eye in an alternating manner, the LR images that are alternated at 120 Hz; and is thereby able to stereoscopically see the LR images.

3. Format of 3D Image Signal

FIG. 3 is a schematic diagram showing the format of a 3D image signal inputted into the projector 100.

FIG. 3(a) shows a side-by-side format, in which each of the LR images is compressed in the horizontal direction, whereby the LR images are displayed on one screen. The LR images according to the side-by-side format are inputted using the normal high definition (HD) method, National Television Standards Committee (NTSC) method, or a similar method. FIG. 3(b) shows a top-and-bottom format, in which the LR images are compressed in the vertical direction, whereby the LR images are displayed on one screen. The LR images according to the top-and-bottom format are also inputted using the normal HD method, NTSC method, or a similar method. FIG. 3(c) shows a frame packing format, in which no compression is performed either in the horizontal direction or the vertical direction, and the LR images are transmitted at a clock rate that is double that of the side-by-side format or the top-and-bottom format. According to the frame packing format, if the LR images are to be displayed using the HD method or the NTSC method on one screen, it is necessary to perform format conversion during adjustment. FIG. 3(d) shows a line alternative format, in which LR images are displayed alternately line by line. According to the line alternative format, it is necessary to perform format conversion during adjustment because it is necessary to perform interpolation processing line by line.

4. Functional Configuration of Projector 100

Figure 4:
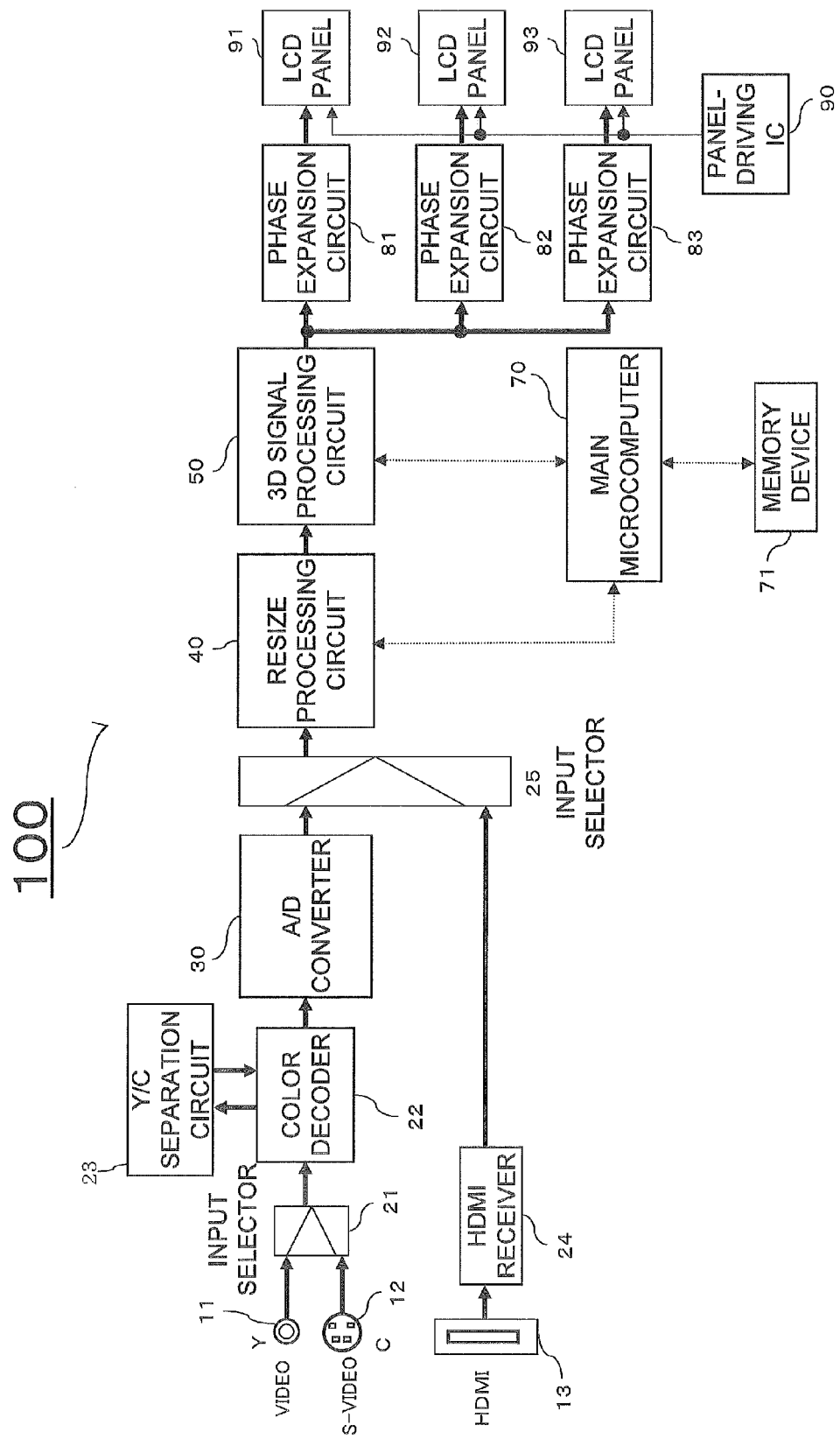
FIG. 4 is a block diagram showing the functional configuration of the projector.

FIG. 4 is a block diagram showing the functional configuration of the projector 100. The function of the projector 100 will be divided into a first-stage portion and a second-stage portion and described in sequence below.

4-1. First-stage Portion

The projector 100 comprises, in the first-stage portion, an analog input correspondence unit configured from a video input terminal 11, an S video input terminal 12, an input selector 21, a color decoder 22, a Y/C separation circuit 23, and an A/D converter 30; and a digital input correspondence unit configured from an HDMI input terminal 13 and an HDMI receiver 24.

In the analog input correspondence unit, one of the image signals inputted into the video input terminal 11 and the S video input terminal 12 is first selected by the input selector 21 according to a command from the user. The image signal selected by the input selector 21 is processed by the color decoder 22 and the Y/C separation circuit 23 and converted into an RGB signal according to the type of video signal standard; and then inputted into the A/D converter 30. Specifically, the color decoder 22 performs color decoding, to produce a YPbPr signal, on a signal that has been subjected to Y/C separation by the Y/C separation circuit 23 or a Y/C signal inputted from the input selector 21. The Y/C separation circuit 23 separates a composite video signal inputted from the color decoder 22 into a Y signal and a C signal. The A/D converter 30 converts an analog signal selected by the input selector 21 into a 10-bit digital signal.

In the digital input correspondence unit, first, a 3D image signal and a 2D image signal defined according to HDMI 1.4a are inputted into the HDMI input terminal 13. The HDMI receiver 24 converts an image signal inputted from the HDMI input terminal 13 into a parallel signal. An input selector 25 selects an input from the A/D converter 30 or an input from the HDMI receiver 24 and outputs the selected input to a resize processing circuit 40. In an instance in which a 2D signal is outputted from the input selector 25 to the resize processing circuit 40, the 2D signal is resized in the resize processing circuit 40 to a pixel number that corresponds to the number of pixels displayed in an LCD panel, and then outputted to the second-stage portion without being processed by a 3D signal processing circuit 50. In an instance in which a 3D image signal is outputted from the input selector 25 to the resize processing circuit 40, the 3D image signal is resized in the resize processing circuit 40, and then subjected, under a control performed by a main microcomputer 70, to brightness/contrast (i.e., signal amplitude), gamma correction, color conversion, and other image processing of the 3D image signal in the 3D signal processing circuit 50. At this time, the 3D image signal that has been subjected to image processing is stored by the main microcomputer 70 in a memory device 71. The 3D image signal includes a right-eye image signal (hereafter referred to as a "R signal") for the R image and a left-eye image signal (hereafter referred to as a "L signal") for the L image.

Figure 5:
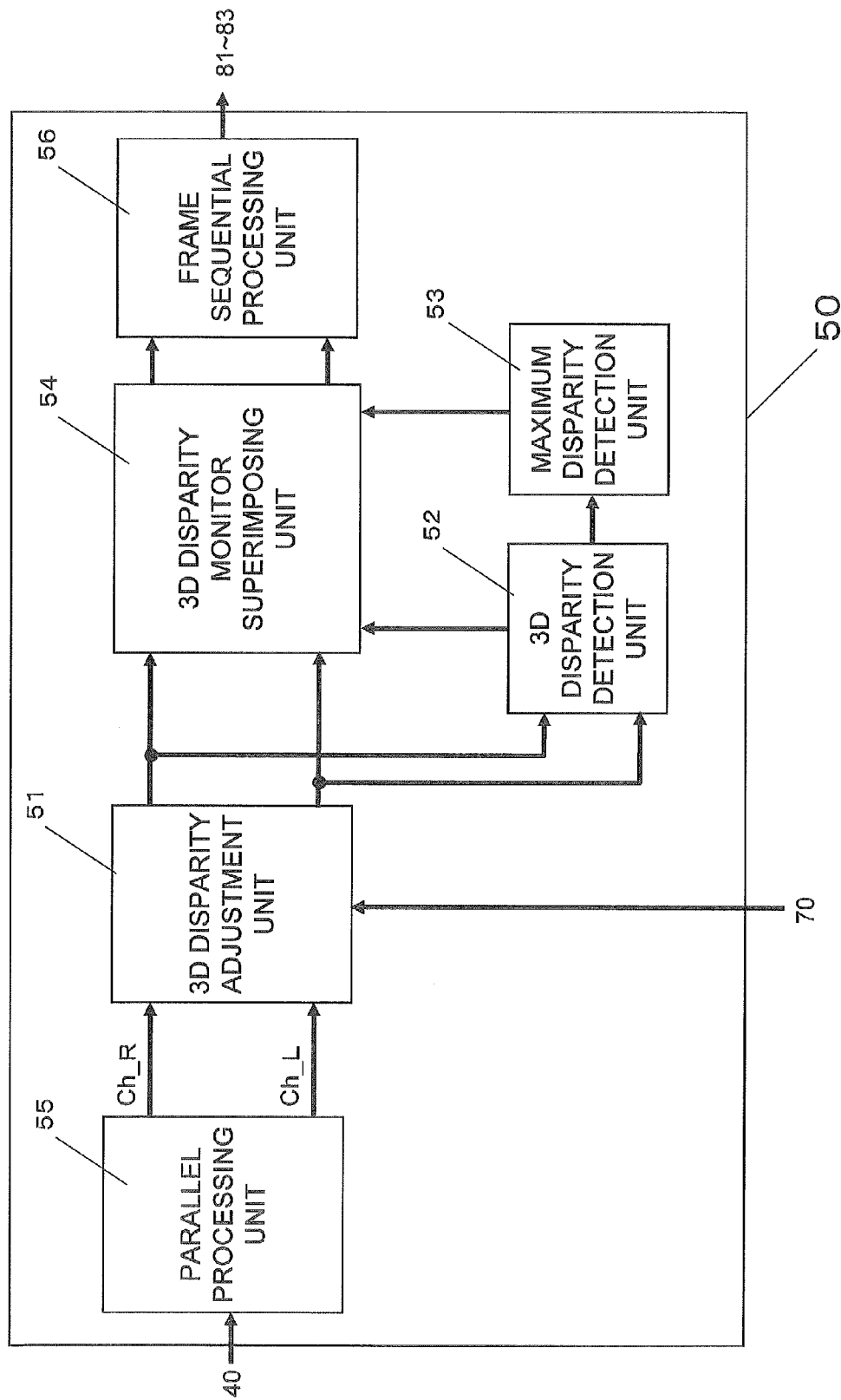
FIG. 5 shows the functional configuration of a 3D signal processing circuit.

Next, the functional configuration of the 3D signal processing circuit 50 will be described. FIG. 5 is a block diagram showing the functional configuration of the 3D signal processing circuit 50.

A parallel processing unit 55 obtains a 3D image signal from the resize processing circuit 40. Based on the 3D image signal, the parallel processing unit 55 outputs to a parallax adjustment unit 51 LR signals corresponding to LR images for a single screen, at coordinated timing.

The parallax adjustment unit 51 obtains the LR signals from the parallel processing unit 55. The parallax adjustment unit 51 adjusts the amount of parallax of the LR images based on the LR signals according to a control signal inputted via the main microcomputer 70. The control signal acquire from the main microcomputer 70 is generated according to a modification to the amount of parallax made by the user on a menu screen in an instance in which, e.g., the amount of parallax in a 3D video image is too large or too small. In an instance in which no control signal is inputted from the main microcomputer 70, the parallax adjustment unit 51 outputs, to a parallax detector 52 and a parallax monitor superimposing unit 54, the LR signals outputted from the parallel processing unit 55, without adjusting the amount of parallax of the LR signals.

The parallax detector 52 obtains the LR signals outputted from the parallax adjustment unit 51. The parallax detector 52 detects the amount of parallax between the LR images in real time based on the LR signals. The parallax detector 52 notifies a maximum parallax detector 53 and the parallax monitor superimposing unit 54 of the detected amount of parallax between the LR images.

Figure 6:
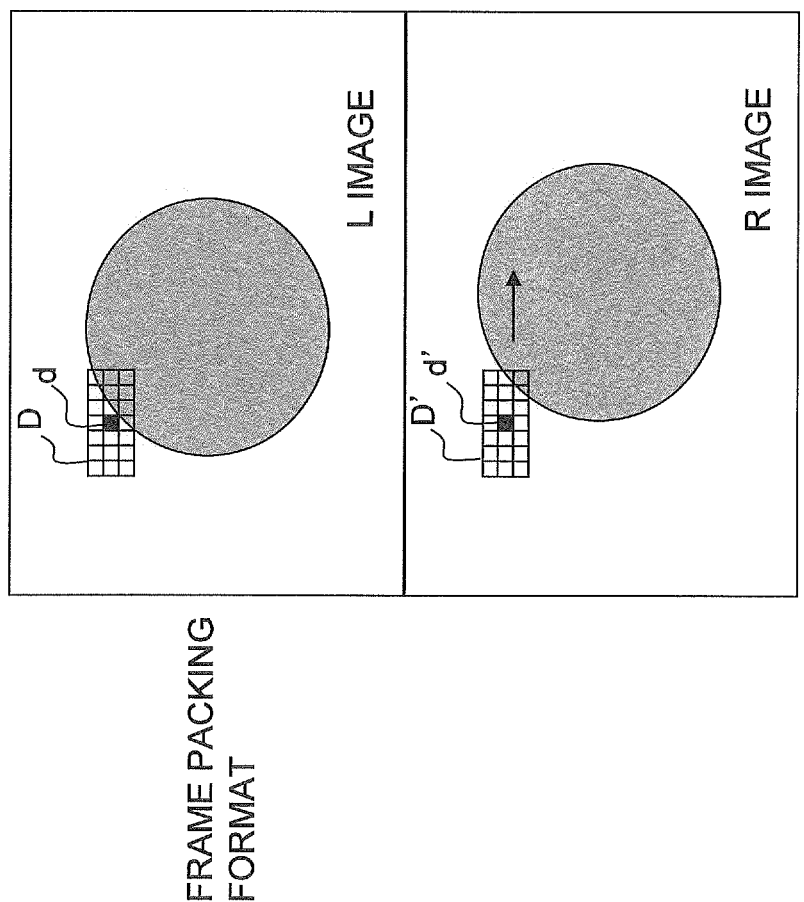
FIG. 6 is a schematic diagram used to illustrate the method for detecting the amount of parallax in the LR images.

A description will now be given for a method for detecting the amount of parallax between the LR images with reference to FIG. 6. FIG. 6 is a schematic diagram used to illustrate the method for detecting the amount of parallax in the LR images according to the frame packing format. As shown in FIG. 6, the parallax detector 52 establishes a first window region D including a first watched pixel d and surrounding pixels in the L image, and a second window region D' including a second watched pixel d' and surrounding pixels in the R image. The parallax detector 52 then calculates a difference value of the average brightness in each of the first window region D and the second window region D' while keeping the position of the first window region D in the L image immobilized and horizontally shifting the second window region D' in the R image from side to side. The parallax detector 52 detects the amount of parallax between the LR images based on the amount by which the second window region D' has shifted when the calculated difference value becomes zero. In an instance in which, e.g., the difference becomes zero when the second watched pixel d' of the R image has been shifted rightwards by 4 pixels, the parallax detector 52 detects that a negative parallax of 4 pixels exists between the LR images, i.e., that the amount of parallax between the LR images is 4 pixels.

In the example shown in FIG. 6, each of the first window region D and the second window region D' is represented by a block of 7 pixels in the horizontal direction and 3 lines in the vertical direction, but this is not provided by way of limitation. The size of the first window region D and the second window region D' can be set as appropriate, taking the balance between the parallax detection accuracy and processing load into account. In FIG. 6, LR images according to the frame packing format were used. However, the format of the LR images may also be side-by-side, top-and-bottom, line alternative, or another format.

The maximum parallax detector 53 obtains the amount of parallax between the LR images from the parallax detector 52. The maximum parallax detector 53 detects the maximum amount of parallax on the screen in real time, and holds (i.e., records), at least for an set detection period, the maximum amount of parallax within the detection period. The maximum parallax detector 53 notifies the parallax monitor superimposing unit 54 of the maximum amount of parallax detected in the detection period. The period of detection of the maximum amount of parallax in the maximum parallax detector 53 may be set as a fixed value or set in a selective manner by the user. In a normal 3D video image, the amount of parallax fluctuates between each scene. Therefore, establishing a detection period of about 3 to 10 seconds makes it possible to adjust the amount of parallax in a speedy manner between each scene. Also, establishing the entire screening time of the 3D video image as the detection period makes it possible to identify the maximum amount of parallax within the 3D video image.

In the present embodiment, the maximum parallax detector 53 detects the maximum amount of parallax within a range, corresponding to 0.9 times the total field angle set at a center of the screen. In other words, the maximum parallax detector 53 establishes, along an outer periphery of the screen, a rectangular ring-shaped non-detection frame 2 (see FIG. 9) that does not contribute towards detection of the maximum amount of parallax. It is thereby possible to suppress an abnormal value at a singular point included in the non-detection frame 2 (e.g., a pixel that has an extremely large amount of parallax in a localized manner, displayed due to an impurity component in the LR signals) from affecting the maximum amount of parallax, and therefore to improve the accuracy of detecting the maximum amount of parallax. Also, a viewer is likely to pay attention to an object at the center of the screen, and does not often focus on the periphery of the screen. Therefore, even if the amount of parallax is displayed in a manner that focuses on an object at the center of the screen, any sense of something being unusual as perceived by the viewer remains small.

The parallax monitor superimposing unit 54 (an example of a display unit) obtains the LR signals outputted from the parallax adjustment unit 51. The parallax monitor superimposing unit 54 obtains the amount of parallax between the LR images based on the LR signals outputted from the parallax adjustment unit 51, and obtains, from the maximum parallax detector 53, the maximum amount of parallax within the detection period. The parallax monitor superimposing unit 54 superimposes, onto each of the LR images based on the LR signals outputted from the parallax adjustment unit 51, a parallax monitor 1 (see FIG. 7) for displaying the amount of parallax between the LR images and the maximum amount of parallax. In the present embodiment, "superimpose" is a concept that includes, e.g., displaying a semi-transparent parallax monitor 1 on the LR images in an overlapping manner; displaying an opaque parallax monitor 1 on the LR images in an overlapping manner; and displaying a parallax monitor 1 so as to be arranged above or below the LR images that have been compressed in the vertical direction. The user can refer to the parallax monitor 1 superimposed on the LR images to check the level of the maximum amount of parallax and the current level of parallax for the entire screen, and modify the amount of parallax as required on the menu screen.

The parallax monitor 1 preferably occupies 10% or more of the height of the screen in the vertical direction. It is thereby possible to gain a capacity to visually identify the amount of parallax displayed on the parallax monitor 1. The parallax monitor 1 preferably occupies 15% or less of the height of the screen in the vertical direction. It is thereby possible to readily ascertain the degree by which the amount of parallax is adjusted while looking at the LR images.

The parallax monitor superimposing unit 54 outputs, to a frame sequential processing unit 56, an image signal for the LR images superimposed with the parallax monitor 1.

The frame sequential processing unit 56 modifies the format of the image signal showing the LR images superimposed with the parallax monitor 1 to 3D frame sequential.

4-2. Second-stage Portion

The projector 100 comprises, in the second-stage portion, phase expansion circuits 81, 82, 83; a panel-driving integrated circuit (IC) 90; and LCD panels 91, 92, 93.

The phase expansion circuits 81, 82, 83 are circuits for performing phase expansion on a digital signal using the frame sequential method, taking into account the speed of operation of a driver (not shown) for driving the LCD panels 91, 92, 93.

The panel-driving IC 90 is a circuit for driving the LCD panels 91, 92, 93.

The LCD panels 91, 92, 93 are panels for performing a color display according to the digital signal that has been subjected to phase expansion by the phase expansion circuits 81, 82, 83 at 240 Hz in an instance of a 3D image signal.

5. Operation of the Projector 100

Next, the operation of a principal section of the projector 100 will be described with reference to FIGS. 7 and 8.

With regards to a 3D image, an image displayed according to the frame sequential method is visually perceived as a double image if a parallax is present. However, if this image is viewed using the active shutter glasses 130, a corresponding stereo image enters each of the left and right eyes; therefore, the image can be visually identified as a stereoscopic image, rather than a double image.

In this embodiment, parallax component which appears to burst from the screen 160 is described as "positive", and parallax component which appears to be located behind the screen 160 is described as "negative."

Figure 7:
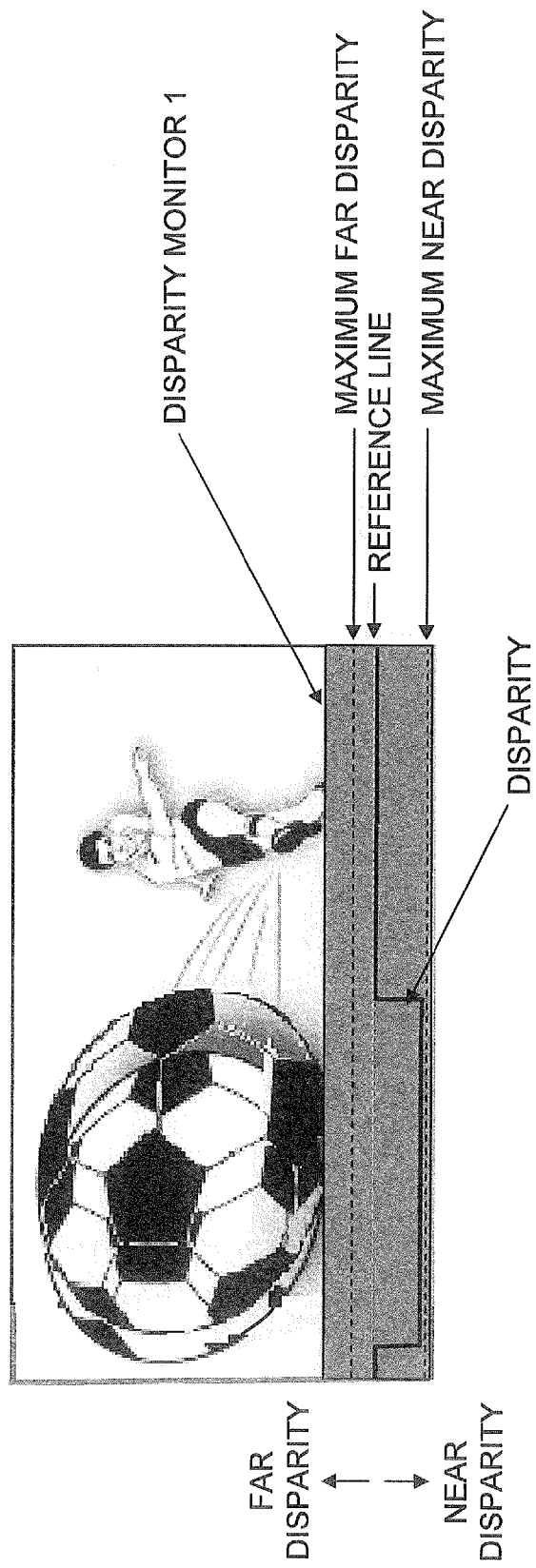
FIG. 7 is a schematic diagram showing an image in which a parallax monitor is superimposed on LR images.

At this time, the projector 100 superimposes the parallax monitor 1 below the LR images as shown in FIG. 7. On the parallax monitor 1, positive parallax is displayed on a lower side (an example of one side) and negative parallax is displayed on an upper side (an example of another side) in relation to a reference line (convergence line). In the example shown in FIG. 7, the amount of positive parallax for a soccer ball is displayed on the parallax monitor 1. Each of the maximum amount of negative parallax and the maximum amount of positive parallax within the detection period is displayed on the parallax monitor 1. The period of detection of the maximum amounts of parallax can be set by the user using an on-screen menu as shown in FIG. 8. Normally, either 3 seconds or 10 seconds is selected. However, in an instance in which a maximum value for two hours is to be detected, such as for movie contents, the "ALL" option on the menu is selected. The on-screen menu also contains a menu for controlling the ON/OFF-state of the display of the parallax monitor 1 or for selecting a screen size.

Figure 9:
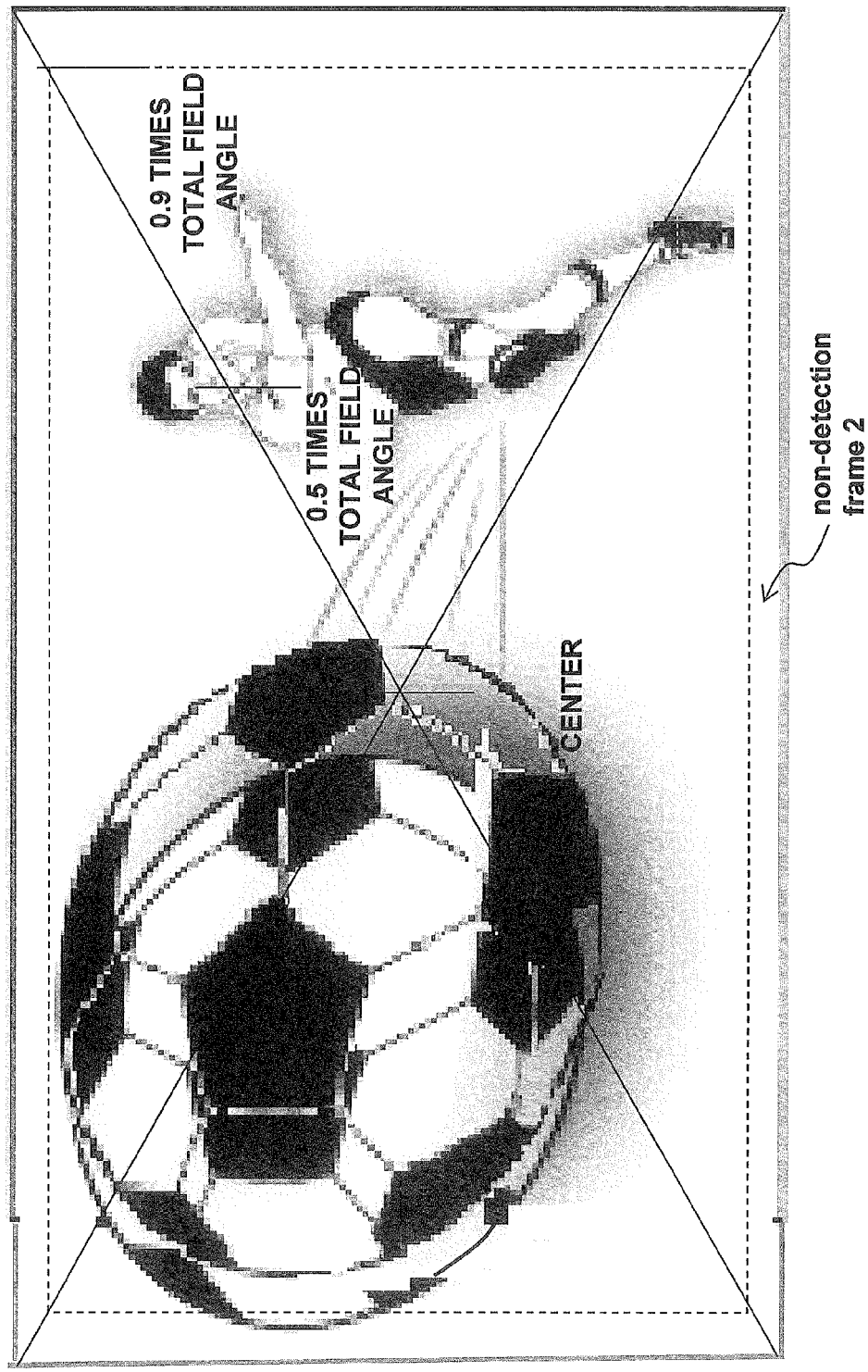
FIG. 9 is used to illustrate a range for detecting the parallax.

The projector 100 also establishes a non-detection frame 2 on the outer periphery of the screen as shown in FIG. 9, and thereby detects the maximum parallax within 0.9 times the total field angle.

6. Action and Effect

When a maximum parallax line is positioned at an uppermost or a lowermost section on the parallax monitor 1, the user can, in order to suppress the parallax using the parallax adjustment unit 51, move the horizontal position of each of the LR image signals and thereby reduce the parallax. When a maximum parallax line is positioned near the reference line on the parallax monitor 1, the user can, conversely, move the horizontal position of each of the LR image signals and adjust the parallax so as to be larger.

In a state in which the amount of parallax is superimposed on the LR screens, it is thus possible to adjust the parallax based on the maximum parallax in the LR screens. Therefore, the 3D image can be displayed according to a suitable parallax state. As a result, it is possible to provide a 3D image that subjects the user to less biological fatigue.

Second Embodiment

The configuration of the projector 100 according to a second embodiment will now be described. However, the basic configuration of the projector 100 is similar to that of the first embodiment. Therefore, the description given below primarily concerns the difference in relation to the first embodiment.

Figure 10:
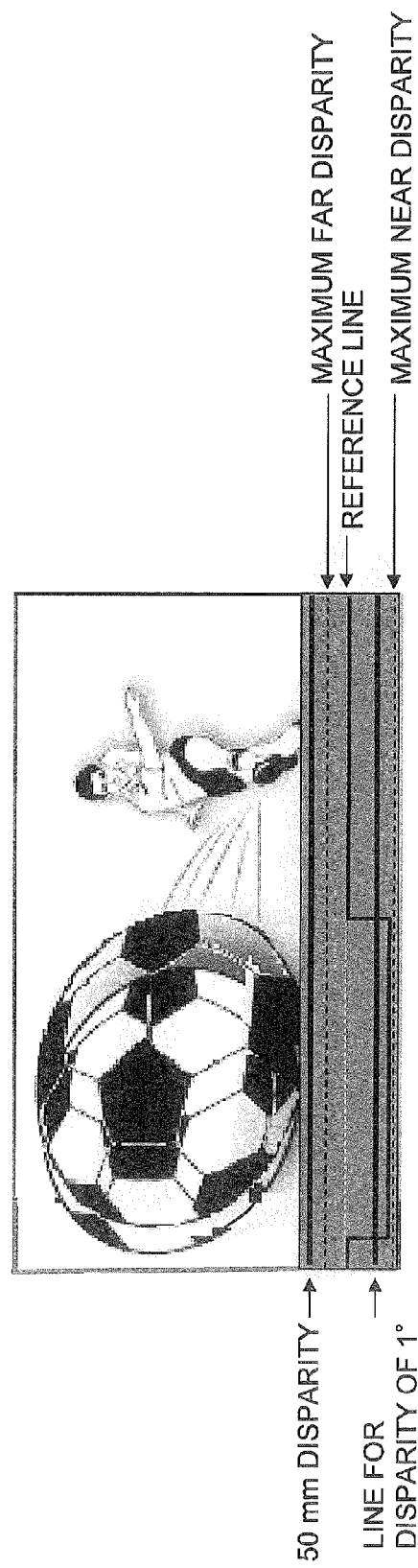
FIG. 10 shows an example of displaying the parallax monitor.

The difference in relation to the first embodiment is that, as shown in FIG. 10, the projector 100 displays, on the parallax monitor 1, a line indicating a parallax angle of 1° on the positive parallax side of the reference line and a line indicating a parallax corresponding to 50 mm on the screen on the negative parallax side of the reference line.

Although a parallax angle of 1° varies depending on visual distance, displaying is performed on the assumption that the screen is viewed from a distance that is three times its height, which represents a standard visual distance, i.e., approximately 3 meters for an 80-inch 16:9-aspect screen. In the present embodiment, a set-up is present as described above as a reference, because the distance from which the projector image is to be viewed cannot normally be specified.

The negative parallax exceeding the human interocular distance of approximately 65 mm between the left and right eyes results in an image that causes biological discomfort. In order to prevent such an occurrence, a line corresponding to 50 mm on the screen is displayed.

Figure 8:
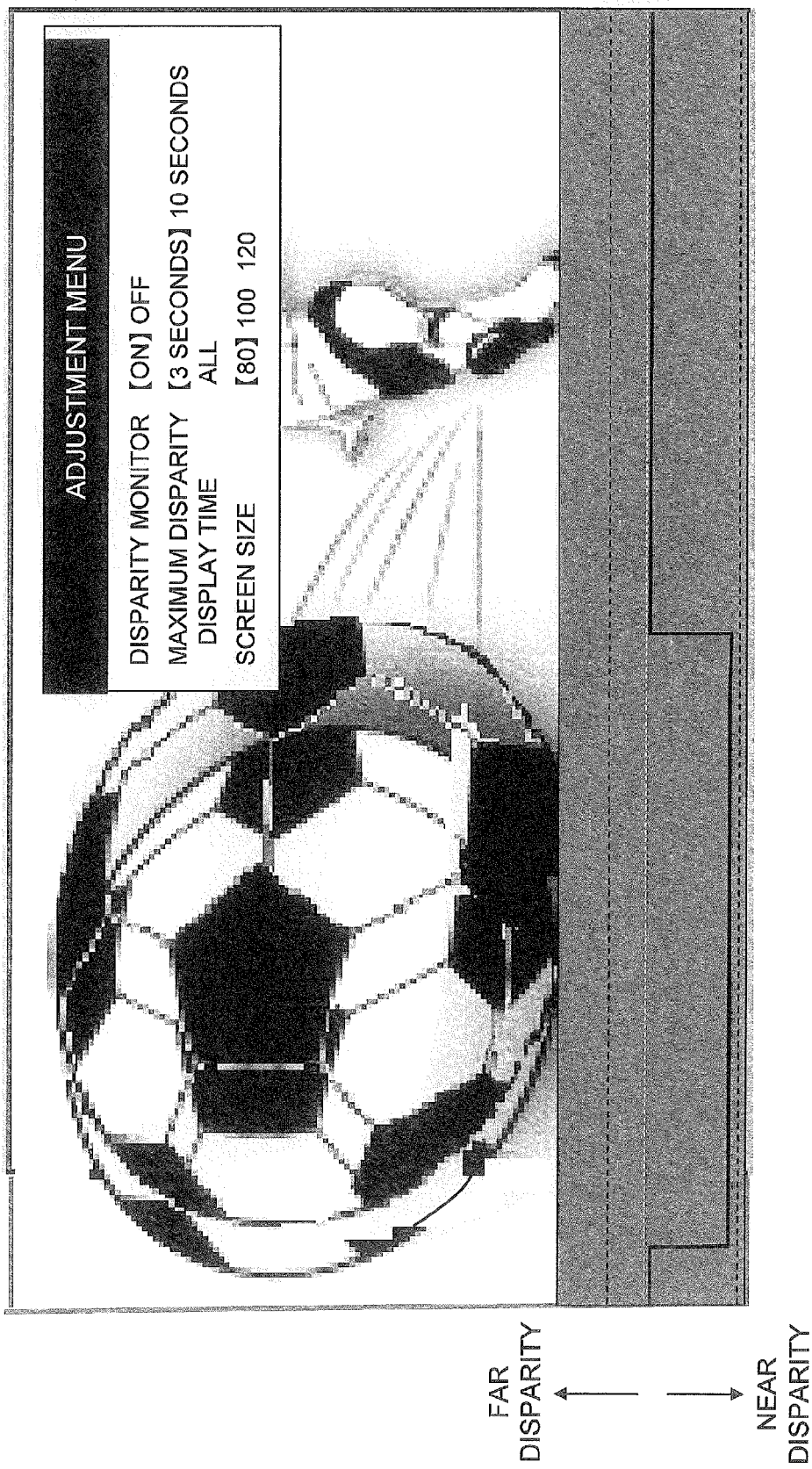
FIG. 8 is a schematic diagram showing a screen in which a parallax monitor and an adjustment menu are superimposed on LR images.

In order to calculate this line corresponding to 50 mm, as shown in FIG. 8, the screen size is inputted in advance using the on-screen menu, whereby the line corresponding to a parallax of 50 mm as calculated by the main microcomputer 70 is displayed at a magnification according to the screen size.

In an instance in which the maximum parallax on the spring-out side displayed on the parallax monitor 1 is equal to or greater than a parallax angle of 1°, the user adjusts the horizontal position of the LR images using the parallax adjustment unit 51 so as to minimize the positive parallax. In an instance in which the maximum parallax on the depth side exceeds the 50-mm line, the user adjusts the horizontal position of the LR images using the parallax adjustment unit 51 so as to minimize the negative parallax.

A parallax-adjusting operation of such description can also be performed automatically by the main microcomputer 70. In other words, in the projector 100, the main microcomputer 70 may automatically adjust the horizontal position of the LR images in an instance in which the negative parallax is equal to or greater than 50 mm or in an instance in which the positive parallax becomes equal to or greater than a parallax angle of 1°.

Thus, in the second embodiment, it is again possible to adjust the parallax based on the maximum parallax of a movie or other content in a Blu-Ray or other format in a state in which results of detecting the amount of parallax in the content are superimposed. Therefore, a 3D image including a suitable parallax can be displayed. Also, even in an instance of a projector or another display in which the screen size can be freely changed, by inputting the screen size in advance, it is possible to adjust the parallax while observing the amount of parallax. Therefore, the user can view the 3D video image at a suitable parallax in accordance with the screen size.

What is claimed is:

1. An image display device comprising:
a parallax adjustment unit configured to obtain a 3D image signal, the 3D image signal including a right-eye image signal and a left-eye image signal, the parallax adjustment unit being further configured to adjust a parallax between the right-eye image signal and the left-eye image signal to output an adjusted signal, the adjusted signal including an adjusted right-eye image signal and an adjusted left eye image signal;
a parallax detector configured to detect an amount of parallax between the adjusted right-eye image signal and the adjusted left-eye image signal;
a maximum parallax detector configured to detect a maximum value of the amount of parallax detected by the parallax detector within a detection period, the maximum parallax detector further configured to vary the detection period; and
a display unit configured to display a right-eye image and a left-eye image based on the adjusted signal, and to display an augmented image, the augmented image including the right-eye image, the left-eye image, and a monitor image indicating the amount of parallax detected and the maximum value of the amount of parallax detected.

2. The image display device according to claim 1, wherein the display unit is configured to display the amount of parallax with reference to a reference line indicating a state in which no parallax is present between the adjusted right-eye image and the adjusted left-eye image.

3. The image display device according to claim 2, wherein the display unit is configured to display an amount of positive parallax on a first side of the reference line and an amount of negative parallax on a second side of the reference line.

4. The image display device according to claim 1, wherein the maximum parallax detector is configured to continuously detect the maximum value of the amount of parallax while the display unit displays the augmented image.

5. The image display device according to claim 1, wherein the maximum parallax detector is configured to detect the maximum value of the amount of parallax of an inward region of a predetermined region provided on an outer periphery of the right-eye image and the left-eye image.

6. The image display device according to claim 1, wherein the parallax detector is configured to detect the amount of parallax based on a difference value taken from the difference between the brightness in a first window region and the brightness in a second window region;
the first window region including a first watched pixel and pixels around the first watched pixel in the right-eye image; and
the second window region including a second watched pixel and pixels around the second watched pixel in the left-eye image, the second watched pixel corresponding to the first watched pixel.

7. The image display device according to claim 4, wherein a period over which the display unit displays the augmented image can be set according to a user operation.

8. The image display device according to claim 1, wherein the maximum parallax sensor is further configured to suppress at least one abnormal value.

9. The image display device according to claim 1, wherein the position of each of the adjusted right-eye image signal and the adjusted left-eye image signal can be set according to a user operation.

10. The image display device according to claim 1, wherein the parallax is adjusted automatically.

11. The image display device of claim 1, wherein the display unit is configured to superimpose the monitor image on at least one of the left eye image and the right eye image of the augmented image.

12. The image display device of claim 1, wherein the display unit is configured to superimpose the monitor image on a portion of the augmented image separate from the right-eye image and left-eye image.

13. The image display device of claim 1, wherein at least one of the right-eye image and the left-eye image is compressed.

14. The image display device of claim 1, wherein the monitor image is an opaque image.

15. The image display device of claim 1, wherein the monitor image is a semi-transparent image.

16. An image display device comprising:
a parallax adjustment unit configured to obtain a 3D image signal, the 3D image signal including a right-eye image signal and a left-eye image signal, the parallax adjustment unit being further configured to adjust a parallax between the right-eye image signal and the left-eye image signal to output an adjusted signal, the adjusted signal including an adjusted right-eye image signal and an adjusted left eye image signal;
a parallax detector configured to detect an amount of parallax between the adjusted right-eye image signal and the adjusted left-eye image signal;
a maximum parallax detector configured to detect a maximum value of the amount of parallax detected by the parallax detector;
a display unit configured to display a right-eye image and a left-eye image based on the adjusted signal, and to display an augmented image, the augmented image including the right-eye image, the left-eye image, and a monitor image indicating the amount of parallax detected and the maximum value of the amount of parallax detected;
the display unit is configured to display the amount of parallax with reference to a reference line indicating a state in which no parallax is present between the adjusted right-eye image and the adjusted left-eye image;
the display unit is configured to display an amount of positive parallax on a first side of the reference line and an amount of negative parallax on a second side of the reference line; and wherein
the display unit is configured to display a line indicating a parallax angle of 1° on the first side of the reference line.

17. An image display device comprising:
a parallax adjustment unit configured to obtain a 3D image signal, the 3D image signal including a right-eye image signal and a left-eye image signal, the parallax adjustment unit being further configured to adjust a parallax between the right-eye image signal and the left-eye image signal to output an adjusted signal, the adjusted signal including an adjusted right-eye image signal and an adjusted left eye image signal;
a parallax detector configured to detect an amount of parallax between the adjusted right-eye image signal and the adjusted left-eye image signal;
a maximum parallax detector configured to detect a maximum value of the amount of parallax detected by the parallax detector;
a display unit configured to display a right-eye image and a left-eye image based on the adjusted signal, and to display an augmented image, the augmented image including the right-eye image, the left-eye image, and a monitor image indicating the amount of parallax detected and the maximum value of the amount of parallax detected;
the display unit is configured to display the amount of parallax with reference to a reference line indicating a state in which no parallax is present between the adjusted right-eye image and the adjusted left-eye image;
the display unit is configured to display an amount of positive parallax on a first side of the reference line and an amount of negative parallax on a second side of the reference line; and wherein
the display unit is configured to display a line indicating an on-screen parallax of 50 mm on the second side of the reference line.

18. The image display device according to claim 17, wherein
the line indicating an on-screen parallax of 50 mm is calculated based on screen size.

* * * * *